United States Patent [19]

Kawakami et al.

[11] Patent Number: 4,537,953

[45] Date of Patent: Aug. 27, 1985

[54] PROCESS FOR PRODUCING AROMATIC SULFIDE POLYMER WITH ALKALINE EARTH METAL OXIDE DEHYDRATING AGENT

[75] Inventors: Yukichika Kawakami; Zenya Shiiki; Yo Iizuka, all of Iwaki, Japan

[73] Assignee: Kureha Kagaku Kogyo Kabushiki Kaisha, Tokyo, Japan

[21] Appl. No.: 647,733

[22] Filed: Sep. 6, 1984

[30] Foreign Application Priority Data

Sep. 7, 1983 [JP] Japan ................................. 58-164692

[51] Int. Cl.³ .............................................. C08G 75/16
[52] U.S. Cl. .................................................... 528/388
[58] Field of Search ......................................... 528/388

[56] References Cited

FOREIGN PATENT DOCUMENTS 103279  3/1984  European Pat. Off. .

Primary Examiner—Harold D. Anderson
Attorney, Agent, or Firm—Wenderoth, Lind & Ponack

[57] ABSTRACT

The improvement in a process for producing an aromatic sulfide polymer from (A) hydrous sulfide of an alkali or alkaline earth metal and (B) a dihalo-aromatic compound is disclosed. The improvement is concerned with how the hydrous sulfide is dehydrated and comprises dehydrating the hydrous sulfide by the action thereon of (C) an alkaline earth metal oxide before substantial formation of the aromatic sulfide polymer.

8 Claims, No Drawings

PROCESS FOR PRODUCING AROMATIC SULFIDE POLYMER WITH ALKALINE EARTH METAL OXIDE DEHYDRATING AGENT

BACKGROUND OF THE INVENTION

1. Field of the Art

This invention relates to a process for producing an aromatic sulfide polymer according to the dehalogenation/sulfidation reaction of a dihalo-aromatic compound with a metal sulfide. More specifically, the present invention relates to a process for producing an aromatic sulfide polymer having a markedly high molecular weight with extremely good reproducibility which has a primary feature in practicing this reaction according to a specific method.

In recent years, it has been required of thermoplastic resins for use as members or parts in electronic appliances or automobile appliances to have still higher heat resistance. Aromatic sulfide polymers are endowed with properties of a resin which can meet such a requirement. However, due to the nature of this resin conventionally produced such that a polymer endowed with high crystallinity and with sufficiently high molecular weight can hardly be obtained, it is very difficult to fabricate the resin into films, sheets or fibers and there is also a great problem that the formed product is very brittle. The present invention is to overcome these problems, and provides a process for producing a linear aromatic sulfide polymer having a markedly high molecular weight.

2 Prior Art

The following processes have been known for production of aromatic sulfide polymers.

(1) A process in which elementary sulfur, dichlorobenzene and a base (e.g., $Na_2CO_3$) are caused to react in the molten state in the absence of a solvent (e.g., U.S. Pat. Nos. 2,513,183 and 2,538,941).

(2) A process in which an alkali metal sulfide, particularly hydrous $Na_2S$, is heated in a polar solvent to remove the water of hydration in the hydrous $Na_2S$, dichlorobenzene is added thereto and polymerization under heat is carried out (e.g., U.S. Pat. No. 3,354,129).

(3) A modification of the above process (2), in which the step of dehydration is conducted in the presence of a carboxylic acid salt, dichlorobenzene is added thereto and polymerization under heat is carried out (e.g., U.S. Pat. Nos. 3,919,177 and 4,089,847).

However, to the best knowledge of the present inventors, these processes are not very satisfactory. For example, according to the above process (1), the resultant polymer has a molecular weight which is too low and therefore it may be difficult to obtain a practical linear aromatic sulfide polymer. According to the process (2), a polymer having a molecular weight slightly higher than that of the polymer of the process (1) can be obtained, but yet it may be difficult to obtain a polymer having a high molecular weight sufficient enough for a practical linear aromatic sulfide polymer. The process (3) has been proposed for the purpose of overcoming the problem inherent in the process (2) that molecular weight of the resultant polymer is not very high and the improvement has in fact been made to a considerable extent. However, even according to this process, so far as the present inventors know, it may be considerably difficult to obtain a polymer having a high molecular weight sufficient enough for producing tough films, sheets and fibers with good reproducibility. Reproducibility is of a particular importance in commercial production.

The primary reasons why it is difficult to obtain a polymer of high molecular weight with good reproducibility may be attributed to the fact that the water is removed from hydrous $Na_2S$ (including the reaction product formed in situ between hydrous NaHS and NaOH), which is one of the starting materials, through evaporation by heating the hydrous $Na_2S$ in a polymerization solvent, whereby (a) sufficient dehydration is hardly possible, and it is difficult to control the residual water content, (b) during the dehydration the sulfur content in the metal sulfide is entrained with the water as, e.g. $H_2S$ to be a loss, with the result that the amount of the sulfur content present in the reaction system is fluctuated, and (c) under the state where water remains in a considerable amount, the metal sulfide will corrode the reaction vessel used, and the heavy metal ions dissolved out due to the corrosion inhibit formation of a polymer of a high molecular weight.

Still another problem of the process (3) may reside in that polymerization conducted in the presence of a large amount of a water-soluble organic salt will result in formation of aqueous waste containing a large amount of the salt dissolved therein, whereby a problem of environmental pollution may occur and a considerable amount of cost is required for removal of such a problem.

SUMMARY OF THE INVENTION

The present invention is to solve the problems of the prior art as described above and provides a process for producing a linear aromatic sulfide polymer with an unexpectedly high molecular weight suitable for fabrication into products such as tough films, sheets and fibers economically, which process is substantially free from the problem in pollution.

The present inventors have studied extensively concerning how a linear aromatic sulfide polymer of a high molecular weight can be obtained with good reproducibility, and consequently found that it is important to dehydrate the hydrous metal sulfide sufficiently as required and quantitatively, but such a physical method as evaporation of the water by heating the sulfide in a polymerization solvent entails the various problems as mentioned above and is not satisfactory. As the result of further study, it has been discovered that dehydration can be effected sufficiently as required and quantitatively by the use of a potent dehydrating agent in a large amount, and an aromatic sulfide polymer can be obtained with good reproducibility by the use of such a method. Accordingly, a large number of dehydrating agents were sought after, and it has been found that an alkaline earth metal oxide is not only a potent dehydrating agent but can give unexpectedly a polymer of very high molecular weight. The present invention has been accomplished on the basis of such findings.

The process for producing an aromatic sulfide polymer according to the present invention comprises subjecting (A) a hydrous sulfide of a metal selected from the group consisting of alkali metals and alkaline earth metals and (B) a dihalo-aromatic compound to a reaction in an aprotic solvent to form the aromatic sulfide polymer, characterized by the improvement which comprises contacting the hydrous sulfide (A) with an effective amount of (C) an alkaline earth metal oxide before the reaction between the reactants (A) and (B) is substantially initiated, thereby to dehydrate the hydrous sulfide (A).

In the present invention, the terms "a metal sulfide", "a diahalo-aromatic compound", "an alkaline earth metal oxide" and "an aprotic solvent" must be understood to be inclusive of the case where respective compounds or substances referred to are mixtures within the respective scopes defined. Accordingly, for example, the case where "a dihaloaromatic compound" comprises plural kinds, particularly two kinds, of compounds and the resultant aromatic sulfide polymer is a copolymer, is included as a specific example in the present invention.

The present invention, for the purpose of placing the amount of water content in the reaction system under control, is to attain the purpose by intentional use of a hydrous form of the metal sulfide and by quantitative removal of the water according to chemical dehydration with a specific dehydrating agent, namely an alkaline earth metal oxide. It should be stated to be unexpected that a polymer of very high molecular weight can be obtained by such dehydration means and also that such an effect can be recognized inherently in the use of a specific dehydrating agent.

According to the process of the present invention, there occurs substantially no corrosion or staining of the wall of a polymerization vessel. Therefore, washing of the inner portion of the polymerization vessel after completion of polymerization can be omitted.

DETAILED DESCRIPTION OF THE INVENTION

Production of polymer

The process for producing an aromatic sulfide polymer is based on the dehalogenation/sulfidation reaction of a dihalo-aromatic compound with a metal sulfide.

Metal sulfide (A)

For the sulfide, which can function as the sulfur source and dehalogenating agent in the polymerization reaction of the present invention, a sulfide of a metal selected from the group consisting of alkali metals and alkaline earth metals is used. A sulfide of an alkali metal such as N, K, etc. and an alkaline earth metal such as Ca, Mg, Ba, Sr, etc. may preferably be used. Among them, in view of easiness in handling and stability, the sulfide of Na is particularly preferred.

Metal sulfides, according to the present invention, are hydrous. "Hydrous" herein used is inclusive, in addition to the case of having water of crystallization, also of the cases where the sulfide contains free water within the range that these sulfide can be handled as granules or powder. This condition in the present invention is advantageous, since a completely or absolutely anhydrous product of a sulfide has difficulty in both availability and production.

The hydrous metal sulfides (A) of the present invention include also those which are formed in situ in a polymerization vessel before addition of an alkaline earth metal oxide (C) according to the following reaction, for instance:

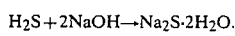

$H_2S + 2NaOH \rightarrow Na_2S \cdot 2H_2O$.

In the process of the present invention, the content of water in the hydrous sulfide may desirably be within the range from 0.25 to 10 mole per mole of the compound. At a level less than 0.25 mole, no dehydrating agent may be required and such a sulfide is expensive. On the other hand, in excess of 10 moles, a large amount of dehydrating agent is required to obtain a sulfide polymer of high molecular weight, which is also undesirable from economical standpoint.

When the metal sulfide used is sparingly soluble in the polymerization solvent used, the sulfide should preferably be of a small particle size. As to the smallness of the particle size, reference is to be made to be smallness of the particle of the dehydrating agent as will be given hereinbelow.

Dehydrating agent (C)

The most important feature of the present invention resides in the use of a specific dehydrating agent, and this was obtained as the result of the study that a dehydrating agent satisfying the conditions as shown below is adequate.

(1) The dehydrating agent should have a potent dehydrating capability sufficient enough to deprive water (mainly water of crystallization) of a hydrous metal sulfide;

(2) The dehydrating agent should not substantially release the once-absorbed water at the polymerization temperature;

(3) The dehydrating agent should not interfere with the normal polymerization reaction before or after absorption of water;

(4) The dehydrating agent should be removed easily by post-treatment after completion of polymerization; and (5) The dehydrating agent should not be of very expensive.

From these conclusions, an alkaline earth metal oxide such as of Ca, Mg, etc. was found to be preferable as the dehydrating agent in the present invention for the reasons such that it has a dehydrating capability enough to dehydrate a hydrous metal sulfide, that $H_2O$ absorbed is bonded to the $O^{2-}$ ion in the metal oxide to become $2(OH^-)$ ion ($O^{2-} + H_2O \rightarrow 2OH^-$) and firmly bound ionically by the alkaline earth metal cation ("chemical dehydration" in the present invention means this reaction) and will not be set free even at the polymerization temperature, that, as the result of such chemical dehydration, the ion components in the metal sulfide and the ion components in the alkaline earth metal oxide are bonded randomly to each other to form a glassy ion complex (e.g., $Na_2S \cdot 3H_2O + 3CaO \rightarrow (Na^+)_2 \cdot (Ca^{2+})_3(S^{2-})(OH^-)_6$ and the glassy ion complex is considered to have a synergetic effect to promote formation of a high molecular weight polymer in the polymerization reaction, and that the dehydrating agent is not expensive. Oxides of Ca and Mg are particularly preferred, because they can give aromatic sulfide polymers of high molecular weight with good reproducibility. Alkali metal oxides, on the other hand, are not preferred, because side reactions concomitantly occur, which may interfere with the normal polymerization reaction. Oxides of aluminum group metals (e.g., $Al_2O_3$) are also not preferred, because it is difficult to remove them by post-treatment after completion of polymerization.

The alkaline earth metal oxide to be used as the chemical dehydrating agent in the present invention should desirably be dried before use. Particularly, a calcined product is preferred because of its very little water content.

The alkaline earth metal oxide to be used in the present invention should desirably has particle sizes as small as possible for giving higher dehydration speed and effecting uniform reaction, particularly particle sizes of 2 mm or less.

The amount of the alkaline earth metal oxide (C) employed in the process of the present invention must be at the level effective for carrying out the intended chemical dehydration. This amount should desirably be within the range of from 0.5 to 20 mol per mole of the hydrous metal sulfide employed. The "effective amount" of the alkaline earth metal oxide as herein mentioned means the amount to be used within such a range. A particularly preferred amount to be used is within the range of from 1 to 5 mole. At a level less than 0.5 mole, no sufficient dehydrating effect can be obtained, while an excess over 20 moles will lead inevitably to reduction of the proportion of the monomer components per weight of the polymerization starting materials [metal sulfide (A)+dihalo-aromatic compound (B)], which is not desirable from the standpoint of productivity.

The details of the dehydrating step are as hereinafter described.

Dihalo-aromatic compound (B)

The dihalo-aromatic compound corresponding to the monomer which should form the skeleton of the aromatic sulfide polymer may be any one, provided that it has an aromatic nucleus and two halo-substituents on the nucleus and can be polymerized into a polymer through the dehalogenation/sulfidation reaction with an alkali or alkaline earth metal sulfide. Accordingly, the aromatic nucleus includes in addition to those consisting solely of aromatic hydrocarbons, those having various kinds of substituents which do not interfere with the dehalogenation/sulfidation reaction.

More specifically, examples of the dihalo-aromatic compounds which can be used in the present invention include the compounds represented by the following formulae.

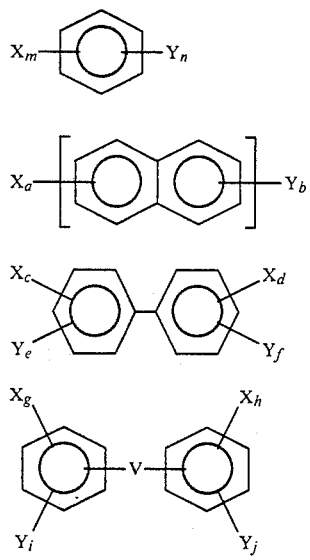

wherein the respective substituents have the following meanings:

X: a halogen selected from the group consisting of Cl, Br, I and F, particularly Cl or Br;

Y: a group selected from the group consisting of —R, —OR and —COOH wherein R is selected from the group consisting of H, alkyl, cycloalkyl, aryl and aralkyl, the alkyl or alkyl moiety having about 1 to 18 carbon atoms, and the aryl or aryl moiety about 6 to 18 carbon atoms.

V: a group selected from the group consisting of

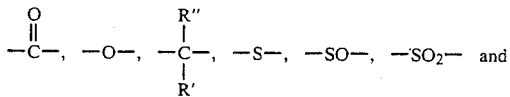

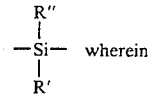

R′ and R″ are each selected from the group consisting of H, alkyl, cycloalkyl, aryl and aralkyl, the alkyl or alkyl moiety and the aryl or aryl moiety being the same as defined above.

m and n are integers of m=2, 0≦n≦4.
a and b are integers of a=2, 0≦b≦6.
c, d, e and f are integers of 0≦c≦2, 0≦d≦2, c+d=2, 0≦e, f≦4.
g, h, i and j are integers of 0≦g≦2, 0≦h≦2, g+h=2, 0≦i, j≦4.

Specific example of the dihalo-aromatic compounds include p-dichlorobenzene, m-dichlorobenzene, 2,5-dichlorotoluene, p-dibromobenzene, 1,4-dichloronaphthalene, 1-methoxy-2,5-dichlorobenzene, 4,4′-dichlorobiphenyl, 3,5-dichlorobenzoic acid, p,p′-dichlorodiphenyl ether, 3,3′-dichlorodiphenyl sulfone, 3,3′-dichlorodiphenyl sulfoxide, and 3,3′-dichlorodiphenyl sulfide. Among them, p-dichlorobenzene, m-dichlorobenzene and 3,3′-dichlorodiphenyl sulfone are particularly preferable.

As mentioned above, it is possible to obtain a copolymer comprising two or more different kinds of reaction units by a suitable selection of the dihalo-aromatic compounds. When p-dichlorobenzene and m-dichlorobenzene or p,p′-dichlorodiphenyl sulfone are used in combination, a copolymer containing the units

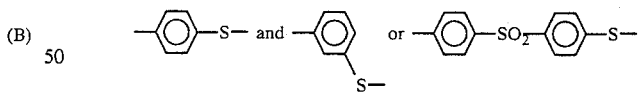

be obtained.

The amount of the dihalo-aromatic compound (B) to be used in the present invention should desirably be within the range of from 0.8 to 1.1 mole per mole of the hydrous metal sulfide (A), particularly within the range of from 0.9 to 1.05 mole to obtain a polymer of high molecular weight. At levels less than 0.8 mole or in excess of 1.1 mole, polymer with sufficiently high molecular weight can hardly be obtained.

The sulfide polymer according to the present invention is a polymer of the above dihalo-aromatic compound, but it is also possible to use a monohalo-compound (not necessarily an aromatic compound) in combination in order to form the terminal end of the polymer formed or control the polymerization reaction or the molecular weight, or to use a polyhalo-compound of trihalo- or higher (not necessarily an aromatic compound) in order to form a branched or crosslinked polymer. Specific examples of these monohalo- or polyhalocompounds, when they are aromatic compounds, would be obvious to those skilled in the art as monohalo- or polyhalo-derivative of the specific examples as set forth above. More specifically, for example, dichlorobenzene can be combined with a small amount of trichlorobenzene to obtain a phenylenesulfide polymer having branchings.

Solvent

The solvent to be used in the polymerization reaction of the present invention is an organic solvent having no active hydrogen, namely an aprotic solvent. A solvent having an active hydrogen is not preferable, because there is a possibility that it may itself interfere with the polymerization reaction or the product formed through the reaction in which the active hydrogen participates may invite secondarily a harmful reaction.

The solvent must be stable under the conditions of the temperature and alkalinity encountered in the polymerization reaction of the present invention, and it should not interfere unduly with the polymerization reaction of the present invention.

This solvent should have a dissolving capability to the extent that it can dissolve at least the starting dihaloaromatic compound and the metal sulfide to the concentration required so as to give $S^{2-}$. Accordingly, this solvent is ordinarily a solvent having nitrogen atom, oxygen atom and/or sulfur atom, namely a polar solvent.

This solvent should desirably be one which will not participate in the dehalogenation/sulfidation reaction similarly as the starting dihalo-aromatic compound (B), and therefore it should not be a halo-aromatic hydrocarbon.

Specific examples of such aprotic solvent may include (1) amides such as hexamethylphosphoric acid triamide (HMPA), N-methylpyrrolidone (NMP), tetramethylurea (TMU), dimethylformamide (DMF), dimethylacetamide (DMA) and others, (2) etherated polyethylene glycol such as polyethylene glycol dialkyl ether wherein polymerization degree is up to about 2000, alkyl groups is about $C_1-C_{20}$, (3) sulfoxides such as tetramethylene sulfoxide, dimethyl sulfoxide (DMSO) and others. Among these, HMPA and NMP have high chemical stability and are therefore particularly preferred.

The amount of the aprotic solvent employed should desirably be within the range of from 0.1 to 10 liter per mole of the hydrous metal sulfide used for polymerization. If the solvent is too small outside the specified range, the viscosity of the reaction system will be too high, whereby uniform polymerization reaction may undesirably be inhibited. On the contrary, with an excessive amount of the solvent outside the specified range, the amount of the solvent used as compared with the amount of the polymer obtained is unduly high, which is not desirable from the economical standpoint.

The solvent should desirably be sufficiently dehydrated.

Other salts

In the process for producing the aromatic sulfide polymer of the present invention, the presence of a third salt other than the metal sulfide (A) and the alkaline earth metal oxide (C) as already described in the polymerization system is not preferred, because such a salt will generally bring about lowering in molecular weight of the polymer formed. However, in the case of the salt (D) as mentioned below, the actual harm is not so great and its presence may be permissible. That is, one or two or more kinds of the third salts selected from the group consisting of carbonates, sulfates, sulfites, halides, phosphates, borates, hydroxides (excluding hydroxides of alkaline earth metals), carboxylates and sulfonates of the metals selected from the group consisting of alkali metals and alkaline earth metals) may be present in the polymerization system. These salts should desirably be sufficiently dehydrated.

Polymerization

In the polymerization process of the present invention, it is desirable that the dehydration of the hydrous metal sulfide (A) with the alkaline earth metal oxide (C) should be carried out at a temperature within the range of from room temperature to 250° C., and thereafter the condensation or polymerization reaction of the dihaloaromatic compound (B) with the metal sulfide (A) at a temperature within the range of from 100° to 250° C.

If the dehydration reaction is carried out at a temperature lower than room temperature or the condensation reaction at a temperature lower than 100° C., it will take a longer time for completion of the reaction resulting in economical disadvantage. On the other hand, if the dehydration reaction or the condensation reaction is carried out at a temperature higher than 250° C., undesirable side reactions such as decomposition of the solvent or the polymer formed may occur.

The dehydration reaction is particularly preferred to be carried out at 80° to 230° C., and the condensation reaction at 180° to 230° C., since a polymer of high molecular weight can rapidly be obtained under such conditions. These reactions may be conducted at constant temperatures, but it is also possible to conduct these reactions while elevating the temperature stepwise or continuously.

In the dehydration reaction of the present invention, heat of hydration is generated greatly when the alkaline earth metal oxide absorbs water, and therefore the enthalpy required for the dehydration reaction can be very small. This is also one of the advantages of the present invention.

The polymerization or condensation process should preferably be practiced by first carrying out dehydration reaction by heating the hydrous metal sulfide (A) and the alkaline earth metal (C) in an aprotic solvent in which the polymerization is to take place, namely a polymerization solvent, and then carrying out condensation polymerization reaction with the dihalo-aromatic compound (B). The dihalo-aromatic compound (B) may already exists during the dehydration reaction, or it may be added after the dehydration reaction. It is generally preferred, however, to add the dihalo-aromatic compound (B) after dehydration reaction for obtaining better results. In the case of adding the dihalo-aromatic compound before dehydrating reaction, good results can easily be obtained by carrying out the dehydration reaction at a temperature considerably lower than the condensation reaction. When a third salt (D) is present in the reaction system, it may be added at any time before the condensation reaction.

According to one embodiment of the present invention, the process for producing an aromatic sulfide polymer thus comprises contacting in the absence of the dihalo-aromatic compound (B) the hydrous sulfide (A) with the alkaline earth metal oxide (C) in the aprotic solvent at a temperature of from room temperature to 250° C. thereby to dehydrate the hydrous sulfide (A), adding to the resultant mixture the dihalo-aromatic compound (B), and heating the resultant mixture at a temperature of from 100° to 250° C. thereby to form the aromatic sulfide polymer.

According to another embodiment of the present invention, the process for producing an aromatic sulfide polymer thus comprises contacting in the presence of the dihalo-aromatic compound the hydrous sulfide (A) with the alkaline earth metal oxide (C) in the aprotic solvent at a temperature which is from room temperature to 250° C. and is so low that no reaction between the reactants (A) and (B) is substantially initiated thereby to dehydrate the hydrous sulfide (A), and heating the resultant mixture at a temperature of from 100° to 250° C. thereby to form the aromatic sulfide polymer.

The amount of the alkaline earth metal oxide (C) must be such that the metal sulfide (A) is dehydrated to the extent sufficiently as required (not completely anhydrous) on initiation of the condensation reaction. As the metal sulfide having some water of crystallization is consumed in the polymerization, the water becomes accumulated in the polymerization system, and therefore the dehydrating agent (C) can be added in the course of or at the later stage of polymerization in order to capture the accumulated water.

For polymerization, various conventional polymerization systems of either batch system or continuous system may be employed. The atmosphere during polymerization should desirably be a non-oxidative atmosphere, and it is preferred to replace the system with an inert gas such as $N_2$ or argon on start-up of the polymerization reaction.

The polymer can be recovered by first evaporating only the solvent by heating the reaction mixture after completion of the reaction under reduced pressure or normal pressure, then washing the residual solids in the reactor once or twice with a solvent such as water, a ketone, an alcohol, an aromatic hydrocarbon, a halogenated hydrocarbon, an ether, etc., followed by neutralization, washing with water, filtration and drying. As an alternative method, it is also possible to add a solvent such as water, an ether, a halogenated hydrocarbon, an aromatic hydrocarbon, or an aliphatic hydrocarbon, which is soluble in the polymerization solvent employed and is a non-solvent at least for the polymer formed, as the precipitation agent to precipitate the solid products such as the polymer formed, the inorganic salts involved, etc., followed by filtration, washing and drying. The "washing" in these cases can be practiced in the form of extraction.

In any of these methods, unless an organic acid salt is present in the reaction system, no problem of contamination caused by the organic acid released as solute in washing water will occur.

Polymer formed

The polymer obtained according to the process of the present invention, which is usually in the form of powder, has an unexpectedly higher molecular weight than the aromatic sulfide polymer powder of the prior art and is a linear polymer which can easily be subjected to oxidation treatment. Therefore, the polymer powder as such or with application of slight oxidation treatment, can be excellent in fiber forming property even with a high melt viscosity and worked very easily by forming into tough heat resistant films, sheets and fibers. The polymer powder has also a considerably large surface area and can be easily freed from the residual ionic impurities by simple washing with hot water. The cleaned polymer is especially suitable for packaging materials for electronic devices. Further, it can also be worked into products according to injection molding, extrusion molding, rotation molding, etc., and the resultant product will suffer hardly from cracks even in the case of a article having a thick wall.

Since the polymer according to the present invention belongs to the category of thermoplastic polymers, it can be subjected to various kinds of modifications applicable for thermoplastic polymers. Accordingly, for example, this polymer can be used with such fillers dispersed therein as powdery fillers such as carbon black, calcium carbonate powder, silica powder, titanium oxide powder, etc. or fibrous fillers such as carbon fiber, glass fiber, asbestos, polyaramide fiber, etc. This polymer can also be used with at least one kind of synthetic resins such as polycarbonate, polyphenylene oxide, polysulfone, polyarylene, polyacetal, polyimide, polyamide, polyester, polystyrene, ABS, etc. mixed therewith.

EXPERIMENTAL EXAMPLES

Examples 1–12

(1) Starting materials (1) Alkaline earth metal oxide (C)

Anhydrous CaO, anhydrous MgO, anhydrous BaO and anhydrous $Al_2O_3$ were prepared by calcining commercially available $Ca(OH)_2$ [AA grade, produced by Junsei Kagaku K.K., Japan], commercially available MgO, BaO and $Al_2O_2$ [each being AA grade, produced by Kanto Kagaku K.K., Japan] which was passed through 100 mesh (Tyler) screen at 600° C. or higher for 3 hours, respectively.

As for $Li_2O$, the reagent produced by Wako Junyaku K.K., Japan was used as such.

(2) Hydrous metal sulfide (A)

Hydrous sodium sulfides $Na_2S.3H_2O$ and $Na_2S.5H_2O$ [produced by Nagao Soda K.K., Japan] and $CaS.3H_2O$ were employed as such.

(3) Halo-aromatic compound (B)

For para-dichlorobenzene (p-DCB), the product of Kureha Kagaku K.K., Japan was used, and for metadichlorobenzene (m-DCB), p,p'-dichlorodiphenylsulfone (DCDPS) and 1,3,5-trichlorobenzene (TCB), the reagents of the A grade produced by Tokyo Kasei K.K., Japan were used, respectively.

(4) Solvent

For N-methyl pyrrolidone (NMP), the product of Dainippon Ink Kagaku K.K., Japan was used, and for hexamethylphosphoric acid triamide (HMPA), the product of Kanto Kagaku K.K.

(5) Third salt

For each of $CaCO_3$, $Na_2CO_3$, $Li_2SO_4$ and $Na_2HPO_4$, the product of Kanto Kagaku K.K. was crushed in a ball mill, passed through a 48 mesh (Tyler) screen and dried at 230° C. under reduced pressure. For $CH_3COONa$, a commercially available $CH_3COONa$

[the product of Kanto Kagaku K.K.] was dried over $P_2O_5$ in a desicator.

(2) Polymerization

An autoclave of 10 liter capacity equipped with a stirring blade was charged with 7.0 liters of a solvent, and the hydrous sulfide (A) and the alkaline earth metal oxide (C) strictly weighed were added thereto. In some cases, the third salt (D) was further added. The autoclave was then sealed, and after replacement of the inner atmosphere of the autoclave with $N_2$, the dehydrating reaction was carried out with stirring under heat at 160° C. for one hour. Then, a mixture of 0.5 liter of the same kind of the solvent employed and a predetermined amount of a halo-substituted aromatic compound (B) was added and polymerization reaction was carried out upon elevation of the inner temperature of the autoclave to a predetermined polymerization temperature, whereat heating was continued for a predetermined period of time.

After completion of polymerization, the autoclave was cooled and the contents were taken out and most of the solvent was removed by heating under reduced pressure at a temperature of 100° C. or lower in a rotary evaporator. The resultant semi-solid product was taken out, neutralized with dil. HCl, thereafter washed with hot water (×3), further subjected to extraction with methanol (×2), and dried at about 80° C. to obtain respective polymers.

(3) Evaluation of physical properties of the polymers obtained

The melt viscosity of the polymer obtained was measured on a pressed plate by means of a flow tester according to the standard of Polymer Society of Japan, Koka flow tester, at 310° C./100 kg load. The pressed plate was prepared by subjecting the polymer powder to melt pressing without pre-heating. The results obtained are set forth in Table 1.

Comparative Example 1

Except for using no anhydrous CaO, polymerization was carried out in the same manner as in Example 1.

Comparative Example 2

Except for using a smaller amount of anhydrous CaO, polymerization was carried out in the same manner as in Example 1.

Comparative Example 3

In the operation of Example 10, the chemical dehydration with anhydrous CaO was substituted by physical dehydration such that $N_2$ was flown through the polymerization vessel under heat at 180° C. to 200° C. for 2 hours in order to remove the water bonded to the hydrous metal sulfide whereby water was removed to some extent, and then p-DCB/NMP mixture was fed to carry out polymerization.

Comparative Example 4

In the operation of Example 1, the chemical dehydration with anhydrous CaO was substituted by physical dehydration such that $N_2$ was flown through the polymerization vessel under heat at 180° C. to 200° C. for 2 hours, in order to remove the water bonded to the hydrous metal sulfide, whereby water was removed to some extent, and then p-DCB/NMP mixture was fed to carry out polymerization.

Comparative Example 5

Polymerization was repeated in the same manner as in Comparative Example 4 for examination of reproducibility.

Comparative Examples 6-7

Polymerization was conducted with the use of the same recipe as in Example 1, except for using an alkali metal oxide ($Li_2O$) and an aluminum group oxide ($Al_2O_3$) as the dehydrating agent, respectively.

The results obtained are summarized in Table 2.

Analysis of the results

Example 11 set forth in Table 1 was conducted for examination of reproducibility of Example 1, which indicates that a polymer having substantially equal viscosity was obtained with good reproducibility.

In Comparative Examples 1, 2, 4 and 5 set forth in Table 2, only the products with apparently lower viscosity (namely lower molecular weight) as compared with Example 1 or Example 11 were obtained. Also, in Comparative Example 3, only the product with apparently lower viscosity as compared with Example 10 was obtained. In Comparative Examples 4 and 5, in spite of using the same recipe, difference in the viscosities of the polymers obtained was great.

In the case of $Li_2O$ as the dehydration agent set forth in Comparative Example 6, decomposition occurred at the initial stage of polymerization reaction and therefore polymerization was discontinued.

In the case of $Al_2O_3$ as the dehydration agent set forth in Comparative Example 7, $Al_2O_3$ could not be removed from the polymer and no measurement of the melt viscosity was conducted.

TABLE 1

| Example No. | Hydrous metal sulfide (A) Kind | Amount charged (mol) | Anhydrous metal oxide (C) Kind | Amount charged (mol) | Halo-aromatic compound (B) Kind | Amount charged (mol) | Aid (third salt) Kind | Amount charged (mol) | Solvent Kind | Amount charged (lit.) | Polymerization conditions Temp. (°C.) | Time (hrs) | Melt viscosity of polymer formed (poise) |
|---|---|---|---|---|---|---|---|---|---|---|---|---|---|
| 1 | $Na_2S.3H_2O$ | 7.5 | CaO | 15.0 | p-DCB | 7.5 | — | — | NMP | 7.5 | 205 | 32 | 8,010 |
| 2 | $Na_2S.3H_2O$ | 7.5 | MgO | 15.0 | p-DCB | 7.5 | — | — | NMP | 7.5 | 205 | 32 | 3,520 |
| 3 | $Na_2S.3H_2O$ $CaS.3H_2O$ | 7.0 0.5 | CaO | 15.0 | p-DCB | 7.5 | — | — | NMP | 7.5 | 200 | 24 | 4,150 |
| 4 | $Na_2S.5H_2O$ | 5.0 | CaO | 15.0 | p-DCB | 5.0 | — | — | NMP | 7.5 | 205 | 32 | 9,210 |
| 5 | $Na_2S.3H_2O$ | 7.5 | CaO | 15.0 | p-DCB | 7.5 | $CaCO_3$ $Na_2CO_3$ $Na_2HPO_4$ | 0.2 0.2 0.2 | NMP | 7.5 | 205 | 32 | 3,730 |
| 6 | $Na_2S.3H_2O$ | 7.5 | CaO | 15.0 | p-DCB | 7.5 | $Li_2SO_4$ | 0.50 | NMP | 7.5 | 205 | 32 | 5,080 |
| 7 | $Na_2S.3H_2O$ | 7.5 | CaO BaO | 14.0 1.0 | p-DCB | 7.5 | — | — | NMP | 7.5 | 215 | 36 | 2,150 |
| 8 | $Na_2S.3H_2O$ | 7.5 | CaO | 15.0 | p-DCB | 7.0 | — | — | NMP | 7.5 | 205 | 42 | 530 |

TABLE 1-continued

| Example No. | Hydrous metal sulfide (A) Kind | Amount charged (mol) | Anhydrous metal oxide (C) Kind | Amount charged (mol) | Halo-aromatic compound (B) Kind | Amount charged (mol) | Aid (third salt) Kind | Amount charged (mol) | Solvent Kind | Amount charged (lit.) | Polymerization conditions Temp. (°C.) | Time (hrs) | Melt viscosity of polymer formed (poise) |
|---|---|---|---|---|---|---|---|---|---|---|---|---|---|
| 9 | Na$_2$S.3H$_2$O | 7.5 | CaO | 15.0 | m-DCB DCDPS p-DCB TCB | 0.25 0.25 7.43 0.07 | — | — | HMPA | 7.5 | 220 | 10 | 65,230 |
| 10 | Na$_2$S.3H$_2$O | 7.5 | CaO | 12.0 | p-DCB | 7.5 | CH$_3$COONa | 2.5 | NMP | 7.5 | 205 | 32 | 3,520 |
| 11 | Na$_2$S.3H$_2$O | 7.5 | CaO | 15.0 | p-DCB | 7.5 | — | — | NMP | 7.5 | 205 | 32 | 8,070 |
| 12 | Na$_2$S.3H$_2$O | 7.5 | CaO | 19.0 | p-DCB | 7.5 | — | — | NMP | 7.5 | 205 | 32 | 10,200 |

TABLE 2

| Comp. Exam. No. | Hydrous metal sulfide (A) Kind | Amount charged (mol) | Anhydrous metal oxide (C) Kind | Amount charged (mol) | Halo-aromatic compound (B) Kind | Amount charged (mol) | Aid (third salt) Kind | Amount charged (mol) | Solvent Kind | Amount charged (lit) | Polymerization conditions Temp. (°C.) | Time (hrs) | Melt viscosity of polymer formed (poise) | Remarks |
|---|---|---|---|---|---|---|---|---|---|---|---|---|---|---|
| 1 | Na$_2$S.3H$_2$O | 7.5 | — | — | p-DCB | 7.5 | — | — | NMP | 7.5 | 205 | 32 | 60 | |
| 2 | Na$_2$S.3H$_2$O | 7.5 | CaO | 1.5 | p-DCB | 7.5 | — | — | NMP | 7.5 | 205 | 32 | 220 | |
| 3 | Na$_2$S.3H$_2$O | 7.5 | — | — | p-DCB | 7.5 | CH$_3$COONa | 2.5 | NMP | 7.5 | 205 | 32 | 180 | Heating dehydration |
| 4 | Na$_2$S.3H$_2$O | 7.5 | — | — | p-DCB | 7.5 | — | — | NMP | 7.5 | 205 | 32 | 190 | Heating dehydration |
| 5 | Na$_2$S.3H$_2$O | 7.5 | — | — | p-DCB | 7.5 | — | — | NMP | 7.5 | 205 | 32 | 90 | Heating dehydration |
| 6 | Na$_2$S.3H$_2$O | 7.5 | Li$_2$O | 7.5 | p-DCB | 7.5 | — | — | NMP | 7.5 | 205 | — | — | Decomposed |
| 7 | Na$_2$S.3H$_2$O | 7.5 | Al$_2$O$_3$ | 7.5 | p-DCB | 7.5 | — | — | NMP | 7.5 | 205 | 32 | — | No measurement of viscosity |

What is claimed is:

1. In a process for producing an aromatic sulfide polymer which comprises subjecting (A) a hydrous sulfide of a metal selected from the group consisting of alkali metals and alkaline earth metals and (B) a dihalo-aromatic compound to a reaction in an aprotic solvent to form the aromatic sulfide polymer, the improvement which comprises contacting in the aprotic solvent the hydrous sulfide (A) with an effective amount of (C) an alkaline earth metal oxide before said reaction between the reactants (A) and (B) is substantially initiated thereby to dehydrate the hydrous sulfide (A).

2. A process for producing an aromatic sulfide polymer according to claim 1, wherein the amount of the alkaline earth metal oxide (C) employed is within the range of from 0.5 to 20 moles per mole of the hydrous metal sulfide (A) employed.

3. A process for producing an aromatic sulfide polymer according to claim 1, wherein the alkaline earth metal oxide (C) is CaO or MgO.

4. A process for producing an aromatic sulfide polymer according to claim 1, wherein the amount of the dihalo-aromatic compound (B) is within the range of from 0.8 to 1.1 moles per mole of the hydrous metal sulfide (A) employed.

5. A process for producing an aromatic sulfide polymer according to claim 1, wherein the dihalo-aromatic compound (B) is dichlorobenzene.

6. A process for producing an aromatic sulfide polymer according to claim 1, wherein the dihalo-aromatic compound (B) comprises a small amount of a higher halo-substituted aromatic compound which is at least trihalo-aromatic compound.

7. A process for producing an aromatic sulfide polymer according to claim 1, which comprises contacting in the absence of the dihalo-aromatic compound (B) the hydrous sulfide (A) with the alkaline earth metal oxide (C) in the aprotic solvent at a temperature of from room temperature to 250° C. thereby to dehydrate the hydrous sulfide (A), adding to the resultant mixture the dihalo-aromatic compound (B), and heating the resultant mixture at a temperature of from 100° to 250° C. thereby to form the aromatic sulfide polymer.

8. A process for producing an aromatic sulfide polymer according to claim 1, which comprises contacting in the presence of the dihalo-aromatic compound the hydrous sulfide (A) with the alkaline earth metal oxide (C) in the aprotic solvent at a temperature which is from room temperature to 250° C. and is so low that no reaction between the reactants (A) and (B) is substantially initiated thereby to dehydrate the hydrous sulfide (A), and heating the resultant mixture at a temperature of from 100° to 250° C. thereby to form the aromatic sulfide polymer.

* * * * *